(12) United States Patent
Wiggins

(10) Patent No.: US 6,977,973 B1
(45) Date of Patent: Dec. 20, 2005

(54) SYSTEM AND METHOD FOR DECODING MANCHESTER DATA

(75) Inventor: Edmund C. Wiggins, St. Petersburg, FL (US)

(73) Assignee: Raytheon Company, Waltham, MA (US)

(*) Notice: Subject to any disclaimer, the term of this patent is extended or adjusted under 35 U.S.C. 154(b) by 796 days.

(21) Appl. No.: 09/972,257

(22) Filed: Oct. 5, 2001

(51) Int. Cl.[7] .................................................. H03D 3/22
(52) U.S. Cl. ..................................................... 375/333
(58) Field of Search ................................. 375/333, 238, 375/239, 242; 329/312, 313; 370/205

(56) References Cited

U.S. PATENT DOCUMENTS

| | | | |
|---|---|---|---|
| 4,053,837 A | 10/1977 | Ryan et al. | ................. 325/323 |
| 4,185,273 A | 1/1980 | Gowan | ....................... 340/347 |
| 4,605,826 A | 8/1986 | Kanemasa | ............... 179/170.2 |
| 4,757,319 A | 7/1988 | Lankl | .......................... 342/378 |
| 4,884,232 A | 11/1989 | Schlunt | ...................... 364/754 |
| 5,200,980 A * | 4/1993 | Briddell | ..................... 375/333 |
| 6,578,162 B1 * | 6/2003 | Yung | .......................... 714/708 |
| 6,671,328 B1 * | 12/2003 | Poon et al. | ................. 375/295 |

OTHER PUBLICATIONS

Halvorson, D., and Shearer, H., *"Manchester Decoding Based on Transversal Algorithms"*, pp. 1-9, Oct. 13, 1989.

* cited by examiner

*Primary Examiner*—Chieh M. Fan
*Assistant Examiner*—Kevin Kim
(74) *Attorney, Agent, or Firm*—Baker Botts L.L.P.

(57) ABSTRACT

A method for decoding Manchester data is provided that includes receiving input data comprising at least two transition types. Each transition of a specified transition type in the input data is detected. For each pair of consecutive transitions of the specified transition type, a length between the consecutive transitions is determined. Output data is generated based on the length.

14 Claims, 3 Drawing Sheets

SYSTEM AND METHOD FOR DECODING MANCHESTER DATA

The U.S. Government may have certain rights in this invention as provided for by the terms of Grant Nos. N00024-98-C-5432 and N00024-33-C5110 awarded by the U.S. Navy.

TECHNICAL FIELD OF THE INVENTION

This invention relates generally to digital data communication and more particularly to a system and method for decoding Manchester data.

BACKGROUND OF THE INVENTION

Data communication systems often need to provide the ability to communicate a clock signal, in addition to a stream of data. One-typical method of accomplishing this goal is to use Manchester-encoding of the data. Manchester-encoded data provides a means of embedding the clock signal into the data signal.

After receiving Manchester-encoded data, a receiving side of the data communication system has to decode the data and extract the clock signal. However, because of the method used in Manchester-encoding, a continuous string of ones is indistinguishable from a continuous string of zeroes. Thus, Manchester decoders which are operable to decode Manchester-encoded data have to be initialized in order to properly decode an all ones or all zeroes data stream.

Conventional Manchester decoders use measurements of both the rising edges and the falling edges of the Manchester-encoded data in order to decode the data and extract the clock signal. Disadvantages associated with these Manchester decoders include duty cycle distortion effects as a result of the rising edge measurements and the falling edge measurements. In addition, these Manchester decoders typically require a first-in, first-out or other means to synchronize the extracted clock signal to a local clock.

SUMMARY OF THE INVENTION

In accordance with the present invention, a system and method for decoding Manchester data are provided that substantially eliminate or reduce disadvantages and problems associated with previously developed systems and methods. In particular, decoding is accomplished based on a single transition type, instead of based on two transition types.

In one embodiment of the present invention, a method for decoding Manchester data is provided that includes receiving input data comprising at least two transition types. Each transition of a specified transition type in the input data is detected. For each pair of consecutive transitions of the specified transition type, a length between the consecutive transitions is determined. Output data is generated based on the length.

More specifically, in accordance with a particular embodiment of the present invention, previously generated output data is tracked. For this embodiment, the output data is generated based on both the length and the previously generated output data.

Technical advantages of one or more embodiments of the present invention include providing an improved Manchester decoder. In a particular embodiment, Manchester-encoded input data is decoded to generate non-return-to-zero output data, and a corresponding output clock, based on a single transition type. Accordingly, duty cycle distortion effects are minimized, improving the performance of the Manchester decoder. In addition, as a result of the decoding method, the output clock may be synchronized to a local station clock.

Other technical advantages will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which.

DETAILED DESCRIPTION OF THE INVENTION

Figure 1:
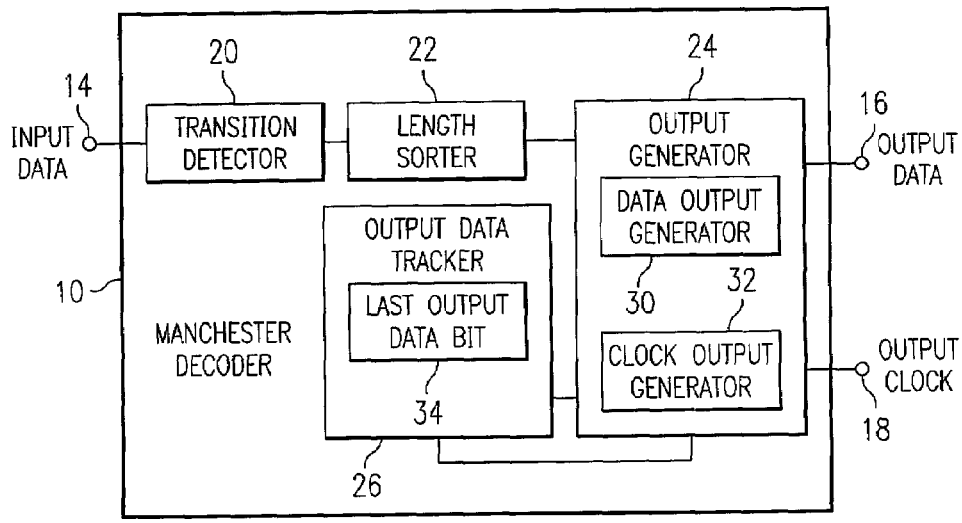
FIG. 1 is a block diagram illustrating a system for decoding Manchester data in accordance with one embodiment of the present invention.

FIG. 1 is a block diagram illustrating a Manchester decoder 10 in accordance with one embodiment of the present invention. The Manchester decoder 10 is operable to receive Manchester-encoded data as input data 14 and to generate non-return-to-zero (NRZ) data as output data 16, along with a corresponding NRZ clock as an output clock 18. Therefore, the Manchester decoder 10 may be part of any system that uses Manchester decoding of data, such as an Ethernet, data communication, or other suitable system.

The Manchester decoder 10 comprises a transition detector 20 for detecting transitions in the input data 14, a length sorter 22 for sorting the input data 14 into one of a plurality of lengths based on the transitions detected by the transition detector 20, an output generator 24 for generating the output data 16 and the output clock 18, and an output data tracker 26 for tracking the output data 16 for use by the output generator 24 in generating the output data 16 and the output clock 18.

Any or all of the transition detector 20, the length sorter 22, the output generator 24, and the output data tracker 26 may comprise logic encoded in media. The logic comprises functional instructions for carrying out program tasks. The media comprises computer disks or other computer-readable media, application-specific integrated circuits, field-programmable gate arrays, digital signal processors, other suitable specific or general-purpose processors, transmission media or other suitable media in which logic may be encoded and utilized.

The transition detector 20 is operable to receive the input data 14, which comprises Manchester-encoded data, and to detect a specified transition type in the input data 14. For example, for input data 14 comprising a series of rising and falling edges, or transitions, the transition detector 20 is operable to detect each rising transition or each falling transition. As used herein, "each" means every one of at least a subset of the identified items. In addition, it will be understood that the transition detector 20 may be operable to detect more than one transition type without departing from the scope of the present invention.

Manchester-encoded data comprises a rising transition during each 0 bit and a falling transition during each 1 bit. However, although the described embodiment uses this type of Manchester-encoded data, it will be understood that similarly encoded data comprising a falling transition during each 0 bit and a rising transition during each 1 bit may be decoded using the Manchester decoder 10 in a similar manner without departing from the scope of the present invention.

For the embodiment described below, the transition detector 20 is operable to detect each rising transition in the input data 14. However, it will be understood that the Manchester decoder 10 may be operable to function in a similar manner with a transition detector 20 that is operable to detect each falling transition in the input data 14.

The length sorter 22 is coupled to the transition detector 20 and is operable to sort portions of the input data 14 into one of a plurality of lengths based on the transitions detected by the transition detector 20. Thus, according to one embodiment, the length sorter 22 is operable to sort the input data 14 based on a time interval between consecutive rising transitions as detected by the transition detector 20.

The lengths may comprise a short (S) interval, a long (L) interval, and an extra long interval (X). According to one embodiment, an S interval comprises a length corresponding to approximately 1 bit, an L interval comprises a length corresponding to approximately 1.5 bits, and an X interval comprises a length corresponding to approximately 2 bits. It will be understood that the length sorter 22 may sort the input data 14 into other suitable lengths without departing from the scope of the present invention.

The output generator 24 is coupled to the length sorter 22 and is operable to generate the output data 16 and the output clock 18. In accordance with one embodiment, the output generator 24 comprises a data output generator 30 that is operable to generate the output data 16 and a clock output generator 32 that is operable to generate the output clock 18. However, it will be understood that the output generator 24 may be otherwise suitably implemented without departing from the scope of the present invention.

The output data tracker 26 is coupled to the output generator 24 and is operable to track the output data 16 for use by the output generator 24 in generating the output data 16 and the output clock 18. According to one embodiment, the output data tracker 26 comprises a last output data bit 34 that is operable to store the previously generated bit of output data 16. As described in more detail below, the output generator 24 is operable to generate the output data 16 and the output clock 18 based on data received from the length sorter 22 and, in many cases, based on data received from the output data tracker 26.

In operation, the Manchester decoder 10 receives Manchester-encoded input data 14 at the transition detector 20. The transition detector 20 detects each rising transition in the input data 14. The transition detector 20 provides the length sorter 22 with a signal to indicate that a rising transition has been detected.

The length sorter 22 determines a length for the input data 14 based on the amount of time that has passed since the previous rising transition was detected by the transition detector 20. The length sorter 22 provides the length to the output generator 24. The output data tracker 26 tracks the last output data bit 34 that was generated by the output generator 24 as output data 16. The output data tracker 26 provides the last output data bit 34 to the output generator 24.

The output generator 24 generates the output data 16 and the output clock 18 either based on the length received from the length sorter 22 or based on both the length and the last output data bit 34 from the output data tracker 26.

Figure 2:
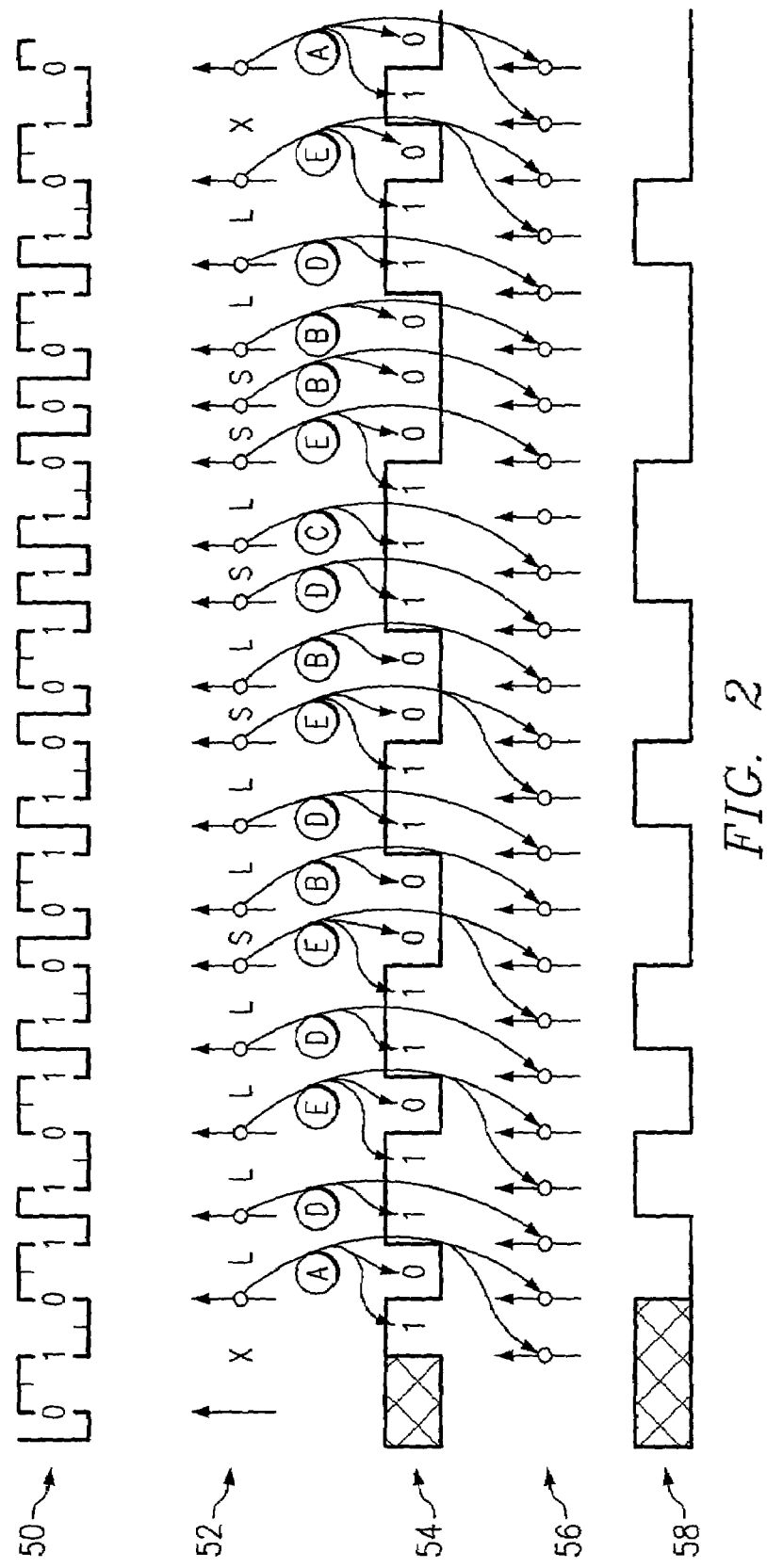
FIG. 2 is a timing diagram illustrating the decoding of input data to generate output data and an output clock by the system of FIG. 1 in accordance with one embodiment of the present invention.

FIG. 2 is a timing diagram illustrating the decoding of input data 14 to generate output data 16 and an output clock 18 by the Manchester decoder 10 in accordance with one embodiment of the present invention. The first line 50 corresponds to the input data 14. The second line 52 corresponds to the rising transitions detected by the transition detector 20. The third line 54 corresponds to the output data 16. The fourth line 56 corresponds to the output clock 18. The fifth line 58 corresponds to the last output data bit 34. The outputs 16 and 18 generated based on particular input data 14 and corresponding rising transitions, in addition to last output data bits 34, are shown by the lines labeled A, B, C, D and E. These labels each correspond to a different scenario, as described in more detail below.

According to one embodiment, in order for the Manchester decoder 10 to be initialized after beginning to receive input data 14, the length sorter 22 detects the first X interval between rising transitions. This corresponds to Scenario A, as described below. In this situation, the output generator 24 generates output data 16 of 1, followed by 0. The output generator 24 also generates an output clock 18 of two rising transitions, with one rising transition for the 1 output data 16, and one rising transition for the 0 output data 16. The rising transition for the 0 corresponds to the rising transition detected by the transition detector 20, while the rising transition for the 1 is generated prior to the rising transition for the 0 by an amount of time corresponding to approximately one bit.

After the Manchester decoder 10 is initialized in this manner, the Manchester decoder 10 continuously generates output data 16 and an output clock 18 based on the input data 14. The outputs 16 and 18 are generated "continuously" in that substantially all of the input data 14 is decoded into output data 16 and an output clock 18 by the Manchester decoder 10 while the Manchester decoder 10 is properly functioning and receiving valid input data 14.

In accordance with one embodiment of the present invention, the output generator 24 generates the outputs 16 and 18 based on one of five possible scenarios. Scenario A occurs when the length sorter 22 detects an X interval. In this situation, the data output generator 30 generates a 1 for output data 16, followed by a 0, and the clock output generator 32 generates an output clock 18 with a rising transition for the 1 and for the 0, as described above in connection with the initialization of the Manchester decoder 10.

Scenario B occurs when the length sorter 22 detects an S interval and the last output data bit 34 comprises a 0. In this situation, the data output generator 30 generates a 0 for output data 16, and the clock output generator 32 generates an output clock 18 with a rising transition corresponding to the rising transition detected by the transition detector 20.

Scenario C occurs when the length sorter 22 detects an S interval and the last output data bit 34 comprises a 1. In this situation, the data output generator 30 generates a 1 for output data 16, and the clock output generator 32 generates an output clock 18 with a rising transition that is prior to the rising transition detected by the transition detector 20 by an amount of time corresponding to approximately 0.5 bits.

Scenario D occurs when the length sorter 22 detects an L interval and the last output data bit 34 comprises a 0. In this situation, the data output generator 30 generates a 1 for output data 16, and the clock output generator 32 generates an output clock 18 with a rising transition that is prior to the rising transition detected by the transition detector 20 by an amount of time corresponding to approximately 0.5 bits.

Scenario E occurs when the length sorter 22 detects an L interval and the last output data bit 34 comprises a 1. In this situation, the data output generator 30 generates a 1 for output data 16, followed by a 0. As with Scenario A, the clock output generator 32 generates an output clock 18 with a rising transition corresponding to the rising transition detected by the transition detector 20, as well as a rising transition prior to the detected rising transition by an amount of time corresponding to approximately one bit.

Figure 3:
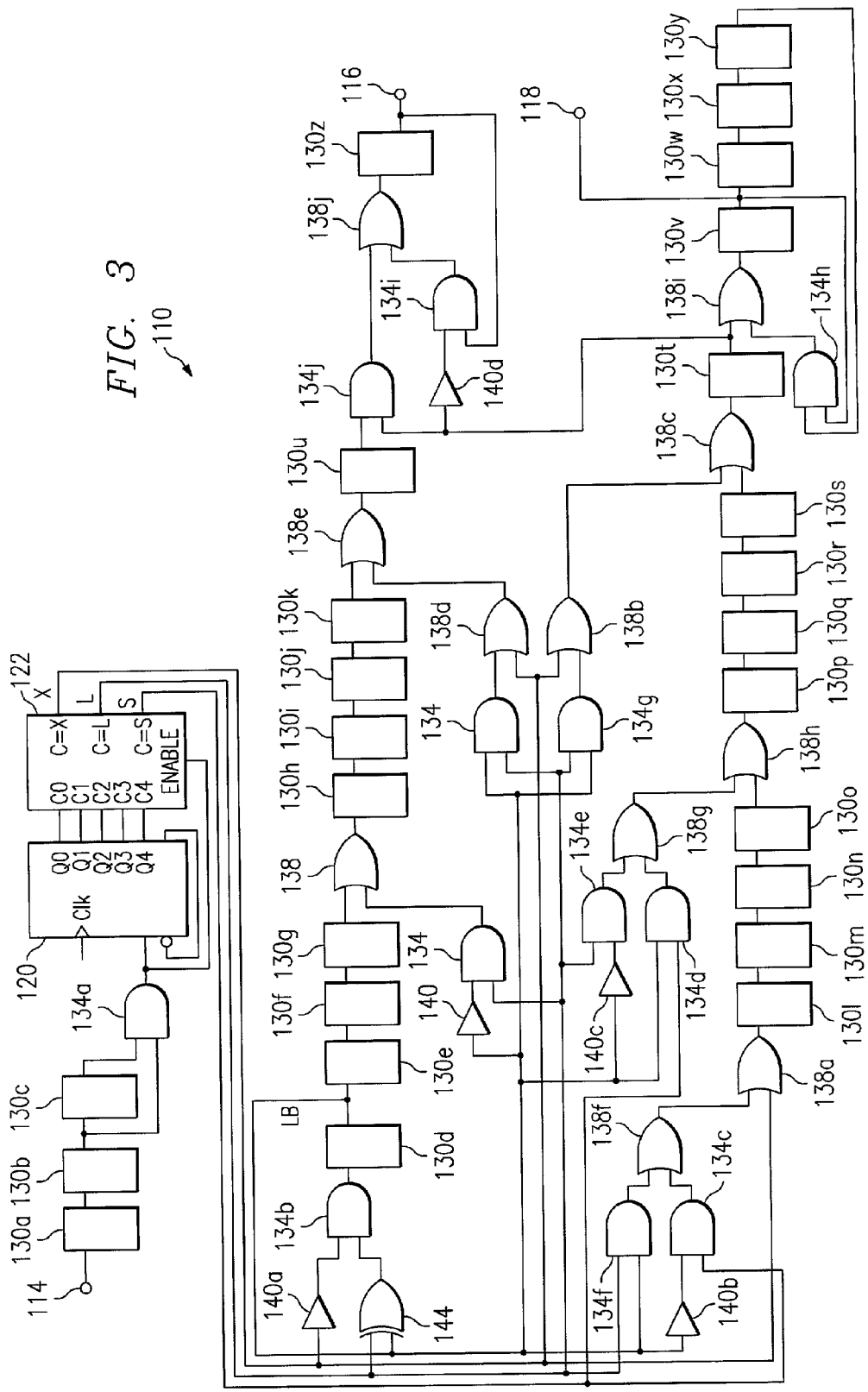
FIG. 3 is a schematic diagram illustrating a system for decoding Manchester data in accordance with one embodiment of the present invention.

FIG. 3 is a schematic diagram illustrating a Manchester decoder 110 in accordance with one embodiment of the present invention. Although this embodiment uses digital logic, it will be understood that a similar embodiment may be implemented with analog delays. According to the illustrated embodiment, the design of the Manchester decoder 110 is a synchronous design with a free running logic clock comprising a rate of approximately eight times the bit rate. However, it will be understood that the clock may comprise any suitable rate without departing from the scope of the present invention. In addition, for clarity, the clock connection to each device in the Manchester decoder 110 is not illustrated in FIG. 3.

The Manchester decoder 110 comprises input data 114, output data 116, an output clock 118, a counter 120, and a decode function 122. The Manchester decoder 110 also comprises a plurality of D-type flip-flops 130, AND gates 134, OR gates 138, and inverters 140, in addition to an XOR gate 144.

To deal with jitter and/or any slight frequency differences between the logic clock and the rate of input data 114, the input data 114 is passed through a synchronizer comprising flip-flops 130*a* and 130*b*. A rising transition detector comprising flip-flops 130*b* and 130*c* and AND gate 134*a* is used to produce a pulse each time a rising transition occurs in the input data 114. This pulse is approximately one clock pulse in width and is used to synchronously reset the counter 120.

According to one embodiment, the counter 120 comprises a five bit counter. The counter 120 is operable to measure the time between consecutive rising transitions. The counter 120 is incremented with each rising transition of the logic clock. Thus, because the logic clock is approximately eight times the bit rate, the counter 120 counts to eight when the time between rising transitions in the input data 114 corresponds to approximately 1 bit. Similarly, when the time between rising transitions in the input data 114 corresponds to approximately 1.5 bits, the counter 120 counts to twelve, and when the time between rising transitions in the input data 114 corresponds to approximately 2 bits, the counter 120 counts to sixteen.

The decode function 122, which may comprise combinatorial logic, produces a pulse on each rising transition when the counter 120 counts to a time corresponding to 1, 1.5 or 2 bits. However, jitter and frequency errors may cause the counter 120 to be slightly off. In addition, because the counter 120 is not reset until the first clock pulse after a rising transition, the nominal values in the counter 120 are actually seven, eleven and fifteen, as opposed to eight, twelve and sixteen. Thus, a range of values may be used to activate the outputs of the decode function 122. For example, the decode function 122 may indicate an S interval when the counter 120 indicates a count of 6, 7 or 8, an L interval when the counter 120 indicates a count of 10, 11 or 12, and an X interval when the counter 120 indicates a count of 14, 15 or 16. However, it will be understood that any suitable values may be used to indicate an S, L or X interval without departing from the scope of the present invention.

If no rising transitions are detected, indicating invalid input data 114, the counter 120 counts up to 31, causing the terminal count to go low. This causes the counter enable input to also go low and the counter 120 to hold at the value 31. As a result, the decoding process is stopped until valid input data 114 is once again received.

Flip-flops 130*d*–*g* delay the data signal by 0.5 bits (four logic clocks), and flip-flops 130*h*–*k* delay the data signal by another 0.5 bits. Similarly, flip-flops 130*l*–*o* delay the clock signal by 0.5 bits, and flip-flops 130*p*–*s* delay the clock signal by another 0.5 bits.

In operation, for Scenario A, as described above, the X line from the decode function 122 is high, and OR gate 138*a* sets flip-flop 130*l* to 1, which corresponds to the current clock rising transition. Also, OR gates 138*b* and 138*c* set flip-flop 130*t* to 1, which corresponds to the prior rising transition. These bits from 130*l* and 130*t* are used to produce the output clock 118.

Since X is high, inverter 140*a* and AND gate 134*b* set flip-flop 130*d* to 0, which corresponds to the current bit of data. Also, OR gates 138*d* and 138*e* set flip-flop 130*u* to 1, which corresponds to the prior bit. Because flip-flop 130*d* is 0, the last output data bit for the subsequent scenario is 0.

For Scenario B, the S line from the decode function 122 is high, and the last output data bit, as determined by the output of flip-flop 130*d*, is 0. As a result, inverter 140*b*, AND gate 134*c*, and OR gates 138*a* and 138*f* set flip-flop 130*l* to 1, which corresponds to the current clock rising transition. This bit from 130*l* is used to produce the output clock 118.

Since S is high, X and L are low. As a result, inverter 140*a*, XOR gate 144, and AND gate 134*b* cause flip-flop 130*d* to hold at its prior value of 0. Because flip-flop 130*d* is 0, the last output data bit for the subsequent scenario is 0.

For Scenario C, the S line from the decode function 122 is high, and the last output data bit, as determined by the output of flip-flop 130*d*, is 1. As a result, AND gate 134*d*, and OR gates 138*g* and 138*h* set flip-flop 130*p* to 1, which corresponds to 0.5 bits prior to the current clock rising transition. This bit from 130*p* is used to produce the output clock 118.

Since S is high, X and L are low. As a result, inverter 140*a*, XOR gate 144, and AND gate 134*b* cause flip-flop 130*d* to hold at its prior value of 1. Because flip-flop 130*d* is 1, the last output data bit for the subsequent scenario is 1.

For Scenario D, the L line from the decode function 122 is high, and the last output data bit, as determined by the output of flip-flop 130*d*, is 0. As a result, inverter 140*c*, AND gate 134*e*, and OR gates 138*g* and 138*h* set flip-flop 130*p* to 1, which corresponds to 0.5 bits prior to the current clock rising transition. This bit from 130*p* is used to produce the output clock 118.

Since L is high, S and X are low. As a result, inverter 140*a*, XOR gate 144, and AND gate 134*b* cause flip-flop 130*d* to toggle from its prior value of 0 to 1. Because flip-flop 130*d* is 1, the last output data bit for the subsequent scenario is 1.

For Scenario E, the L line from the decode function 122 is high, and the last output data bit, as determined by the output of flip-flop 130*d*, is 1. As a result, AND gate 134*f*, and OR gates 138*a* and 138*f* set flip-flop 130*l* to 1, which corresponds to the current clock rising transition. Also, AND gate 134g and OR gates 138b and 138c set flip-flop 130t to 1, which corresponds to the prior clock rising transition. These bits from 130l and 130t are used to produce the output clock 118.

Since L is high, S and X are low. As a result, inverter 140a, XOR gate 144, and AND gate 134b cause flip-flop 130d to toggle from its prior value of 1 to 0. Because flip-flop 130d is 0, the last output data bit for the subsequent scenario is 0.

As the flip-flops 130l–t are clocked, a 1 appears at flip-flop 130t when a rising transition is to appear at the output clock 118. Flip-flop 130v is set high, forming a rising transition, when flip-flop 130t is set to 1. Flip-flops 130w, 130x and 130y, AND gate 124h, and OR gate 138i hold flip-flop 130v high for a time corresponding to approximately 0.5 bits (four logic clocks). Flip-flop 130v then goes low until flip-flop 130t is set to 1 again. This produces an output clock 118 with a duty cycle of approximately 50%. Because of jitter and frequency errors between the logic clock and the input data 114, the output clock 118 may be lengthened or shortened (by one logic clock or other suitable time frame) to remain in synchronism with the input data 114.

As flip-flops 130d–k and 130t are clocked, flip-flop 130u provides the output data 118 when there is a 1 at the output of flip-flop 130u. When the output of flip-flop 130u is a 0, inverter 140d, AND gate 134i, and OR gate 138j set flip-flop 130z to its last value. This holds the output data 116 steady until the next rising transition for the output clock 118.

When flip-flop 130t is a 1, AND gate 134j and OR gate 138j set flip-flop 130z to the value of flip-flop 130u. Flip-flop 130z then holds this value until the next rising transition of the output clock 118. In this way, the output data 116 is generated as NRZ data corresponding to the Manchester-encoded input data 114, and the output data 116 changes synchronously with the output clock 118. According to one embodiment, any circuit using the output data 116 and output clock 118 may sample the output data 116 on the falling transition of the output clock 118 to ensure proper setup and hold times.

Figure 4:
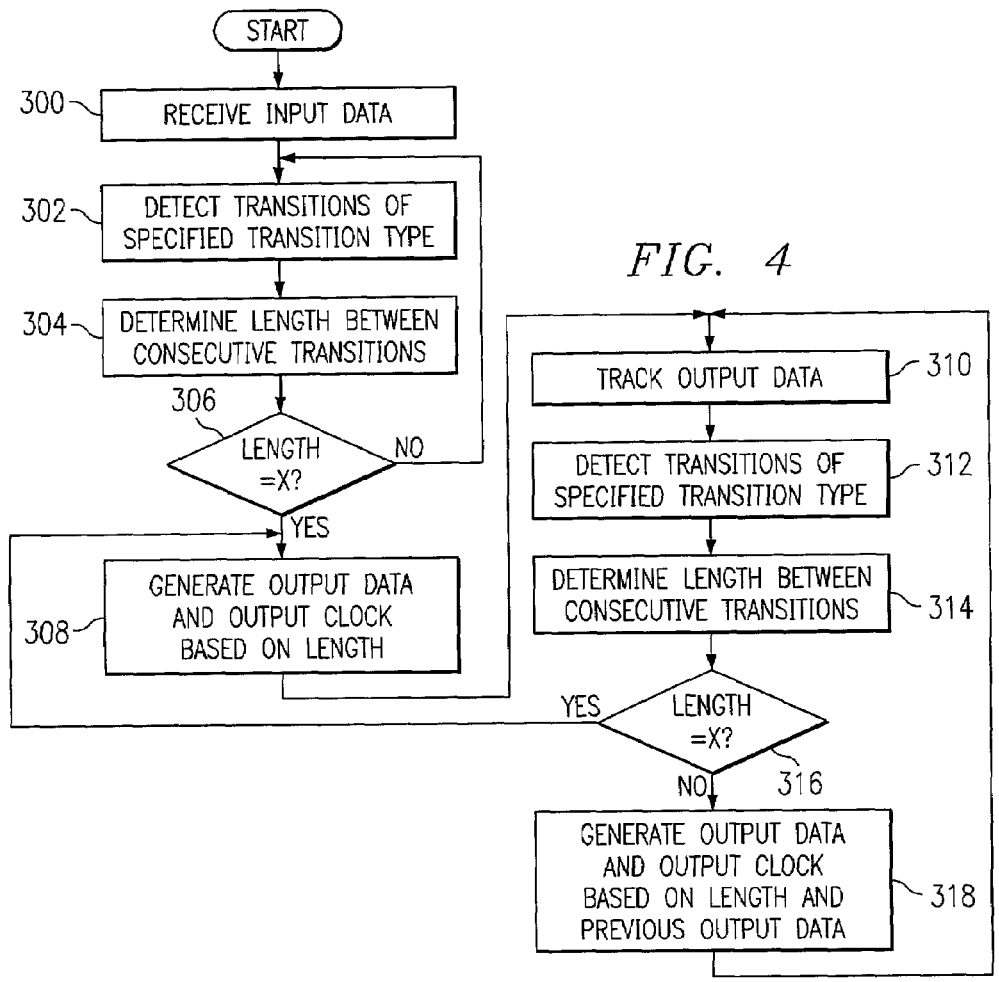
FIG. 4 is a flow diagram illustrating a method for decoding Manchester data with the system of FIG. 1 in accordance with one embodiment of the present invention.

FIG. 4 is a flow diagram illustrating a method for decoding Manchester data with the Manchester decoder 10 in accordance with one embodiment of the present invention. It will be understood that the method may be implemented with the Manchester decoder 110 or other suitable implementation of the Manchester decoder 10 without departing from the scope of the present invention.

The method begins at step 300 where the Manchester decoder 10 receives input data 14. At step 302, the transition detector 20 detects transitions in the input data 14 of a specified type. For example, the transition detector 20 may detect rising transitions or falling transitions. At step 304, The length sorter 22 determines a length between consecutive transitions of the specified transition type as detected by the transition detector 20.

At decisional step 306, a determination is made regarding whether or not the length determined by the length sorter 22 is an X interval. If the length is not an X interval, the method follows the No branch from decisional step 306 and returns to step 302 where the transition detector 20 is continuing to detect the specified type of transition.

However, if the length determined by the length sorter 22 is an X interval, the method follows the Yes branch from decisional step 306 to step 308. At this point, the Manchester decoder 10 is initialized such that further input data 14 may be decoded.

Thus, at step 308, the output generator 24 generates output data 16 and an output clock 18 based on the length determined by the length sorter 22. According to one embodiment, this may be accomplished as described above in connection with FIGS. 2 and 3 based on Scenario A. At step 310, the output data tracker 26 tracks the output data 16. According to one embodiment, the output data tracker 26 stores the last output data bit 34 for use by the output generator 24.

At step 312, the transition detector 20 detects transitions in the input data 14 of the specified type. At step 314, The length sorter 22 determines a length between consecutive transitions of the specified transition type as detected by the transition detector 20.

At decisional step 316, a determination is made regarding whether or not the length determined by the length sorter 22 is an X interval. If the length determined by the length sorter 22 is an X interval, the method follows the Yes branch from decisional step 316 and returns to step 308. At step 308, the output generator 24 generates output data 16 and an output clock 18 based on the length determined by the length sorter 22. According to one embodiment, this may be accomplished as described above in connection with FIGS. 2 and 3 based on Scenario A.

However, If the length is not an X interval, the method follows the No branch from decisional step 316 to step 318. At step 318, the output generator 24 generates output data 16 and an output clock 18 based on the length determined by the length sorter 22 and based on the previous output data 16, or the last output data bit 34, provided by the output data tracker 26. According to one embodiment, this may be accomplished as described above in connection with FIGS. 2 and 3 based on Scenarios B–E. At this point, the method returns to step 310, where the output data tracker 26 continues to track the output data 16.

In this way, the Manchester-encoded input data 14 may be decoded to generate NRZ output data 16 and its corresponding output clock 18 based on a single transition type. Accordingly, duty cycle distortion effects are minimized. As a result, the performance of the Manchester decoder 10 is improved. In addition, the output clock 18 may be synchronized to a local station clock.

Although the present invention has been described with several embodiments, various changes and modifications may be suggested to one skilled in the art. It is intended that the present invention encompass such changes and modifications as fall within the scope of the appended claims.

What is claimed is:

1. A method for decoding Manchester data, comprising:
   receiving input data comprising at least two transition types;
   detecting each transition of a specified transition type in the input data;
   for each pair of consecutive transitions of the specified transition type, determining a length between the consecutive transitions;
   tracking previously generated decoded output data; and
   generating decoded output data based on the length and based on the previously generated decoded output data.

2. The method of claim 1, further comprising generating an output clock signal based on the length.

3. The method of claim 1, further comprising generating an output clock signal based on the length and based on the previously generated decoded output data.

4. The method of claim 1, tracking previously generated decoded output data comprising tracking a last output data bit.

5. The method of claim 1, the at least two transition types comprising a rising transition and a falling transition.

6. A Manchester decoder, comprising:
- a transition detector operable to receive input data comprising at least two transition types and to detect each transition of a specified transition type in the input data;
- a length sorter coupled to the transition detector, the length sorter operable, for each pair of consecutive transitions of the specified transition type, to determine a length between the consecutive transitions;
- an output data tracker coupled to the output generator, the output data tracker operable to track decoded output data previously generated by the output generator; and
- an output generator coupled to the length sorter, the output generator operable to generate decoded output data based on the length and based on the previously generated decoded output data.

7. The Manchester decoder of claim 6, the output generator further operable to generate an output clock signal based on the length.

8. The Manchester decoder of claim 6, the output generator further operable to generate an output clock signal based on the length and based on the previously generated decoded output data.

9. The Manchester decoder of claim 6, the output data tracker operable to track previously generated decoded output data by tracking a last output data bit.

10. The Manchester decoder of claim 6, the at least two transition types comprising a rising transition and a falling transition.

11. A system for decoding Manchester data, comprising:
- a computer-processable medium; and
- logic stored on the computer-processable medium, the logic operable to receive input data comprising at least two transition types, to detect each transition of a specified transition type in the input data, to determine, for each pair of consecutive transitions of the specified transition type, a length between the consecutive transitions, to track previously generated decoded output data and to generate decoded output data based on the length and based on the previously generated decoded output data.

12. The system of claim 11, the logic further operable to generate an output clock signal based on the length.

13. The system of claim 11, the logic further operable to generate an output clock signal based on the length and based on the previously generated decoded output data.

14. The system of claim 11, the at least two transition types comprising a rising transition and a falling transition.

* * * * *